US005666147A

United States Patent [19]

Larson

[11] Patent Number: 5,666,147

[45] Date of Patent: Sep. 9, 1997

[54] METHOD FOR DYNAMICALLY POSITIONING A CONTROL ELECTRODE ARRAY IN A DIRECT ELECTROSTATIC PRINTING DEVICE

[75] Inventor: Ove Larson, Hagen-Langedrag, Sweden

[73] Assignee: Array Printers AB, Vastra Frolunda, Sweden

[21] Appl. No.: 209,420

[22] Filed: Mar. 8, 1994

[51] Int. Cl.[6] .................... B41J 2/41; B41J 2/06; G11B 3/00

[52] U.S. Cl. .................... 347/112; 347/55; 347/149; 347/152

[58] Field of Search .................... 347/120–112, 122, 347/152, 111, 170, 55, 149; 346/74.2, 74.3

[56] References Cited

U.S. PATENT DOCUMENTS 3,566,786 3/1971 Kaufer et al. .................... 346/74.2
3,779,166 12/1973 Pressman et al. .................... 347/124
5,036,341 7/1991 Larsson .................... 347/55

FOREIGN PATENT DOCUMENTS 58-044457 3/1983 Japan .

OTHER PUBLICATIONS

International Search Report for International Application No. PCT/IB 95/00193.

*Primary Examiner*—Huan H. Tran
*Assistant Examiner*—Raquel Yvette Gordon
*Attorney, Agent, or Firm*—Knobbe, Martens, Olson & Bear LLP

[57] ABSTRACT

A method and device to enhance the printing quality of direct electrostatic printers which utilize an electrode array and electrical signals to generate an electrical field to cause toner particles to be deposited directly onto plain paper to form visible images. The invention relates to an improvement to dynamically position and maintain a desired distance between the electrode array and the surface of the charged particles on the particle carrier.

12 Claims, 4 Drawing Sheets

METHOD FOR DYNAMICALLY POSITIONING A CONTROL ELECTRODE ARRAY IN A DIRECT ELECTROSTATIC PRINTING DEVICE

FIELD OF THE INVENTION

The present invention is within the field of electrographical printing devices. More specifically, the invention relates to an improvement to dynamically position a control electrode array to enhance the printing quality of direct electrostatic printers.

BACKGROUND OF THE INVENTION

Of the various electrostatic printing techniques, the most familiar and widely utilized is xerography, wherein latent electrostatic images formed on a charge retentive surface, such as a roller, are developed by a toner material to render the images visible, the images being subsequently transferred to plain paper. This process is called an indirect process since the visible image first formed on an intermediate photoreceptor and then transferred to a paper surface.

Another form of electrostatic printing is known as direct electrostatic printing (DEP). Many of the methods used in DEP, such as particle charging, particle transport, and particle fusing are similar to those used xerography. However, this form of printing differs from xerography in that an electrical field is generated by electrical signals to cause toner particles to be deposited directly onto plain paper to form visible images without the need for those signals to be intermediately converted to another form of energy. It is this concept of simultaneous field imaging and particle transport to produce a visible image directly on plain paper that is novel to direct electrostatic printing.

U.S. Pat. No. 5,036,341 granted to Larson discloses a DEP printing device and a method to produce text and pictures with toner particles on an image receiving substrate directly from computer generated signals. The Larson patent discloses a method which positions a control electrode array, comprised of a latticework of individually controlled wires, between a back electrode and a rotating particle carrier. An image receiving substrate, such as paper, is then positioned between the back electrode and the control electrode array.

An electrostatic field on the back electrode attracts the toner particles from the surface of the particle carrier to create a particle stream toward the back electrode. The particle stream is modulated by voltage sources which apply an electrical potential to selected individual wires of the control electrode array to create electrical fields which permit or restrict transport of toner particles from the particle carrier. In effect, these electric fields "open" or "close" selected apertures in the control electrode array to the passage of toner particles by influencing the attractive force from the back electrode. The modulated stream of charged particles allowed to pass through selected apertures impinge upon a print-receiving medium interposed in the particle stream to provide line-by-line scan printing to form a visible image.

The control electrode array of the above mentioned patent is constructed of a lattice of individual wires arranged in rows and columns. However, a control electrode array may take on many designs. Generally, the array is a thin sheet-like element comprising a plurality of addressable control electrodes and corresponding voltage signal sources connected thereto for attracting the charged toner particles from the particle carrier to the receiving paper substrate by applying voltage signals to the control electrode array to create an electric field between the back electrode and the particle carrier to produce a visible image directly on plain paper. For example, the control electrode array may be constructed of a flexible, non-rigid material and overlaid with a printed circuit such that apertures in the material are arranged in rows and columns and are surrounded by electrodes. Regardless of the design or the material of construction, it is essential to minimize the gap distance between the control electrode array and the surface of the particle carrier to maintain a high print quality. However, this gap distance must not be so minimized as to allow contact between the charged particles on the carrier surface and the control electrode array.

The actual gap between the charged particles and the control electrode array can vary greatly from machine to machine as it is determined by a combination of independent factors such as manufacturing variations in the size and placement of the particle carrier and the control electrode array, as well as the thickness of the particle layer on the particle carrier.

In addition to minimizing the gap between the control electrode array and the particle carrier, it is also desirable to maintain a smooth uniform particle layer thickness on the particle carrier, and to preferably minimize the thickness of this layer to a single particle in depth. Typically, the diameter of an individual particle is on the order of 10 microns, with a particle layer on the particle carrier being approximately 30–40 microns thick.

Because the particle size is only on the order of 10 microns, even the slightest mechanical imperfections can result in a drastic degradation of print quality. For instance, the particle carrier is a rotating cylinder which is neither perfectly round nor perfectly smooth. This eccentricity, along with various surface imperfections on the carrier cylinder are only two of a number of potential irregularities which cause variations in the thickness of the particle layer. Further, the particles themselves may vary in their diameter and degree of sphericity. Thus, to accommodate all of these independent dimensional variations, the gap distance between the control electrode array and the particle carrier is typically increased as a safety factor to insure no contact between the two elements. Although this increased gap distance may insure that the variations in position and dimension do not cause the particle layer to contact the control electrode array surface, it is opposite to the desirability to minimize the gap distance to maintain high print quality.

In the prior art, scraper blades are used to restrict the thickness of the toner particle layer on the particle carrier. Excess particles are scraped from the carrier to reduce the layer thickness such that it was less than the gap distance and thus insured no contact between the control electrode array and the particles on the carrier.

The scraper blade and the control electrode array were both mounted to the printer frame in a fixed position. Typically the scraper blades were constructed of a non-flexible rigid material. In order to insure that the scraper blade did not contact the particle carrier, thus scraping off all of the particles, the scraper blade was offset at some minimum distance to accommodate variations in manufacturing and assembly of the printer. However, increasing the offset distance had the undesirable effect of also increasing the thickness of the particle layer on the carrier. Still further, the scraper blade could have surface imperfections along its scraping edge and might not be mounted perfectly parallel to the surface of the carrier cylinder.

Thus, to insure that there was no contact between the charged particles and the control electrode array, the gap between the particle carrier and the fixed control electrode array was necessarily increased to accommodate the maximum possible particle layer thickness.

As a result, this fixed clearance design with a rigid scraper resulted in an excessively thick particle layer and allowed for considerable variations in that thickness. This in turn required that the gap between the control electrode array and the particle carrier be fixed at a greater than desirable distance.

In an attempt to traverse the disadvantages associated with rigid blades, manufacturers introduced blades constructed of a flexible material such as rubber (see for example, U.S. Pat. No. 3,566,786). The flexible blades were better able to accommodate variations in manufacturing and assembly of the printer. However, because the blade was flexible, it did not consistently provide a uniform force across the length of and against the surface of the particle carrier. Thus, it was difficult to maintain a uniform thickness of particles to be conveyed to the control electrode array. Therefore, to insure that there was no contact between the particle layer and the fixed position control electrode array, the gap between the particle carrier and the control electrode array was again necessarily fixed at a greater than desirable distance to accommodate the maximum possible particle layer thickness.

Thus, there is a need for an improved means for maintaining a constant minimal gap between the control electrode array and the charged particle layer, while simultaneously insuring no contact between the particle layer and the surface of the control electrode array.

SUMMARY OF THE INVENTION

The present invention achieves the above objects and solves the problems presented by the prior art by dynamically maintaining a fixed spacing between charged particles on a particle carrier and their flexible control electrode array. A spacer is mounted on the array on the side facing the particle carrier to engage the carrier or particles on it, and the portion of the array supporting the spacer can move slightly radially towards and away from the carrier to accommodate imperfections in the carrier surface and variations in the particle thickness. This is preferably accomplished by holding the array taut edgewise with spring force while permitting movement of the array to follow the surface of the carrier.

BRIEF DESCRIPTION OF THE DRAWINGS

These and other objects, specific advantages, and features of the present invention will become more apparent upon a reading of the following detailed description of specific examples and embodiments thereof, when read in conjunction with an examination of the accompanying drawings, wherein like reference numerals designate like parts throughout. The dimensions in the drawings are not to scale.

DETAILED DESCRIPTION OF THE INVENTION

Figure 1:
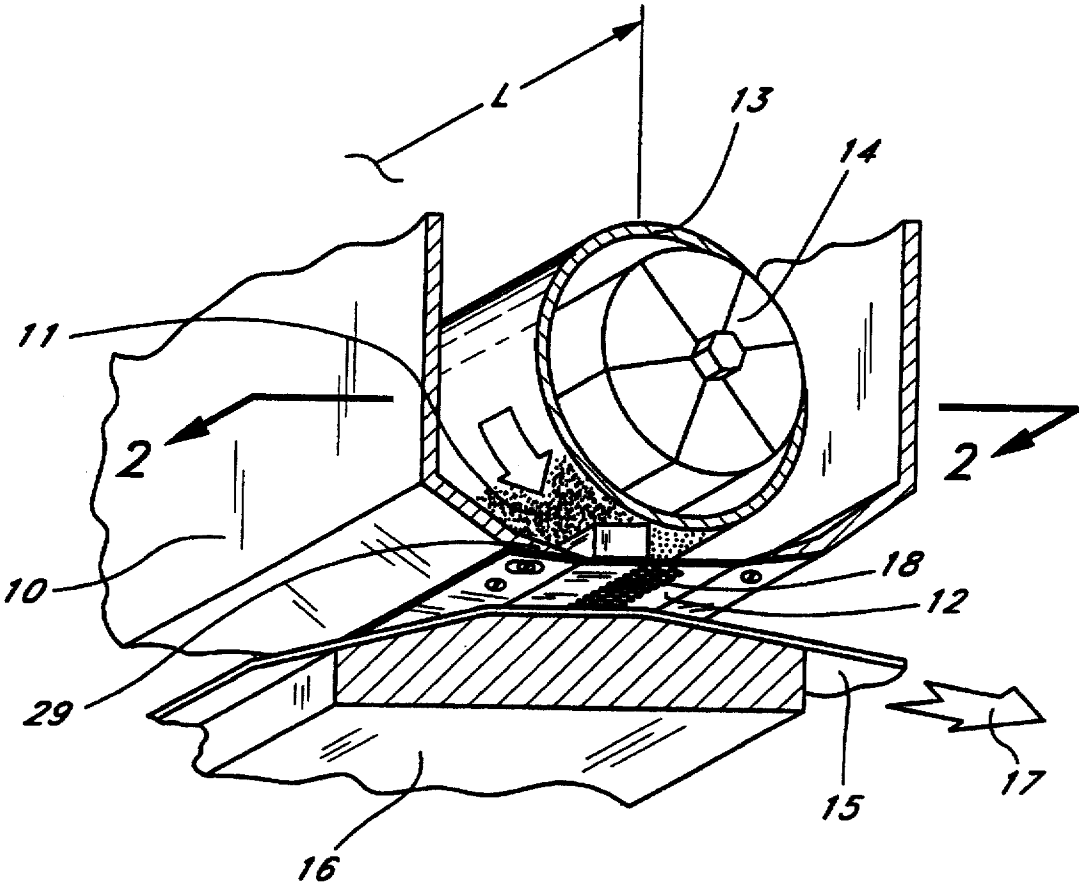
FIG. 1 is a schematic perspective view of a section through the preferred embodiment of the invention.

FIG. 1 shows a printer using a preferred embodiment of the invention. A container 10 for holding toner particles 11 has front and back walls (not shown) a pair of side walls, and a bottom wall with an elongated opening 21 (shown in FIG. 2*a*) extending from the front wall to the back wall. The container 10 provides a mounting surface for a control electrode array 12 which extends across and covers over the opening 21. The control electrode array 12 is schematically shown and is constructed of a thin, sheet-like, non-rigid material overlaid with a printed circuit. A particle carrier 13, here a rotating cylinder with a length L within the container 10, encloses a multiple magnet core 14 which attracts toner particles 11 toward the particle carrier 13.

An image receiving substrate 15 is positioned between the back electrode 16 and the control electrode array 12 and is moved across the back electrode 16 in the direction of the arrow 17. The image receiving substrate 15 is preferably paper, but may be any media suited for direct electrostatic printing. A voltage source (not shown) is connected to the back electrode 16 to attract toner particles 11 from the particle carrier 13, through apertures 18 in the control electrode array 12, onto the image receiving substrate 15. Control voltage signals (not shown) are applied to the control electrode array 12 to create electrical fields which permit or restrict transport of toner particles 11 from the particle carrier 13. In effect, these electric fields "open" or "close" the apertures 18 to passage of toner particles 11 by influencing the attractive force from the back electrode 16. Varying the control voltage signals produces a visible image pattern on the image receiving substrate 15 corresponding to the pattern of the open and closed apertures 18.

As indicated above, the drawings are schematic and not to scale. Certain features have been exaggerated for ease of discussion. For example, the apertures in actuality are much larger in relation to the particles than indicated in the drawings. In practice, an individual particle has a diameter on the order of 10 microns, and the aperture diameter is approximately 18 particle diameters.

Toner particles 11 are preferably composed of magnetic material to cause the particles to be attracted and held to the surface of the particle carrier 13 by the magnetic core 14. Alternatively, the toner particles 11 may be composed of a nonmagnetic material where they are attracted and held to the surface of the particle carrier 13 by an electrostatic force created by triboelectrification of the toner particles 11 through contact with the particle carrier surface 13. As the particle carrier 13 rotates, it rubs against the toner particles 11, so that the toner particles 11 are triboelectrically charged with friction between the rotating particle carrier 13 and the toner particles 11. The polarity of the triboelectrically charged toner particles 11 is determined by the construction material of the toner particles and the particle carrier. In this case, the toner particles are charged negatively, for example. The charged toner particles 11 are then held against the particle carrier 13 due to an electrostatic force. In addition to the triboelectric charging by contact with the particle carrier, the toner particles may also be charged either by charge injection through an electrically conductive scraper blade 26 or by triboelectric contact charge transfer with an electrically insulating scraper blade 26.

Figure 2A:
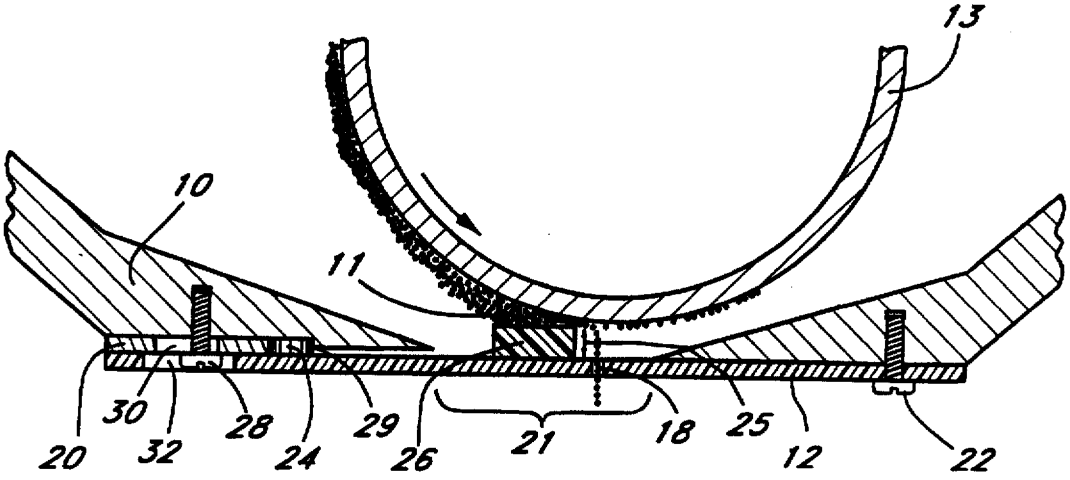
FIG. 2*a* is an enlarged schematic section through the print zone of FIG. 1 showing the scraper in a normal operating position.
Figure 3:
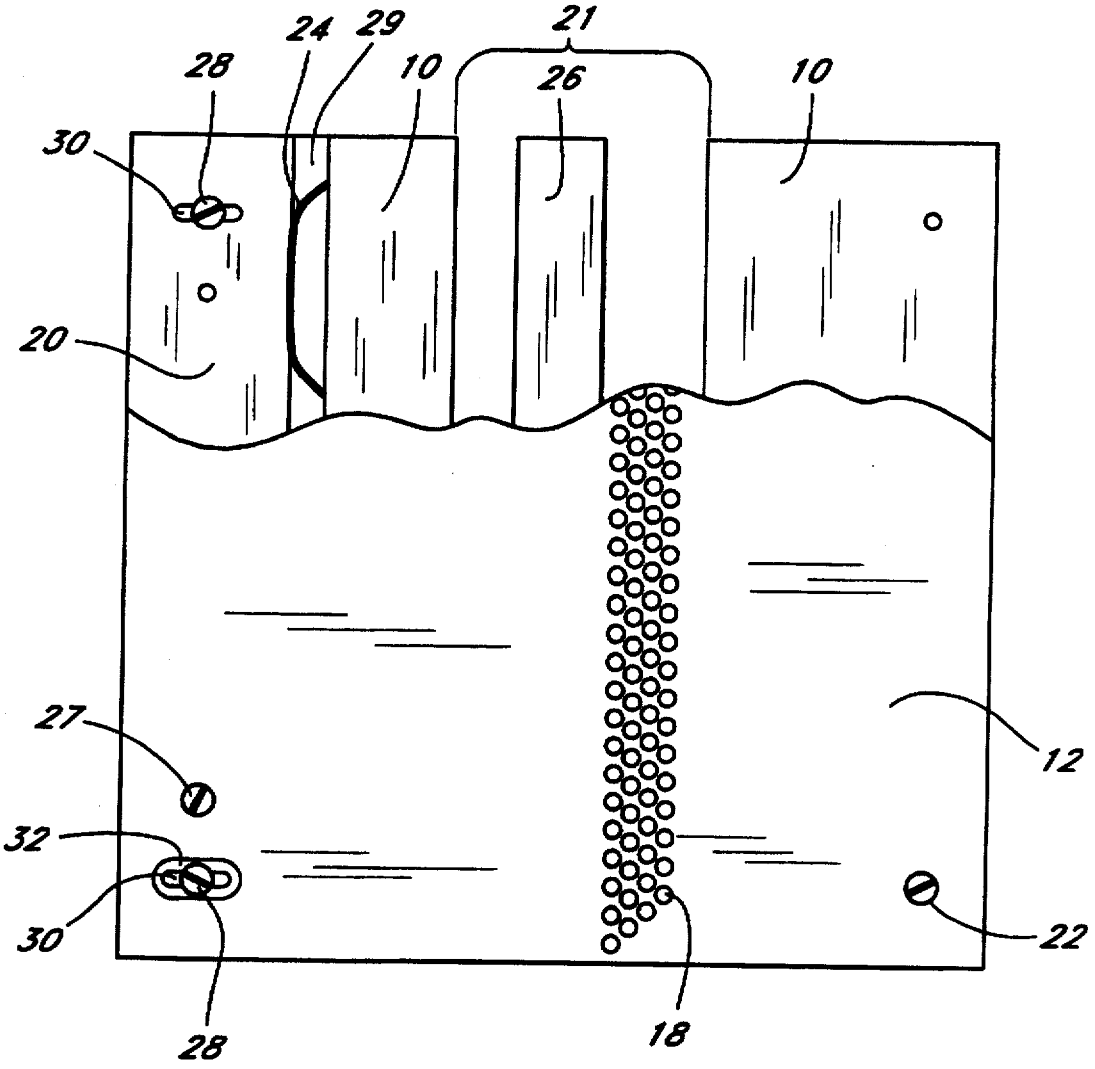
FIG. 3 is a schematic plan view from below of the control electrode array with a cutaway view showing the various elements of the device.
Figure 4:
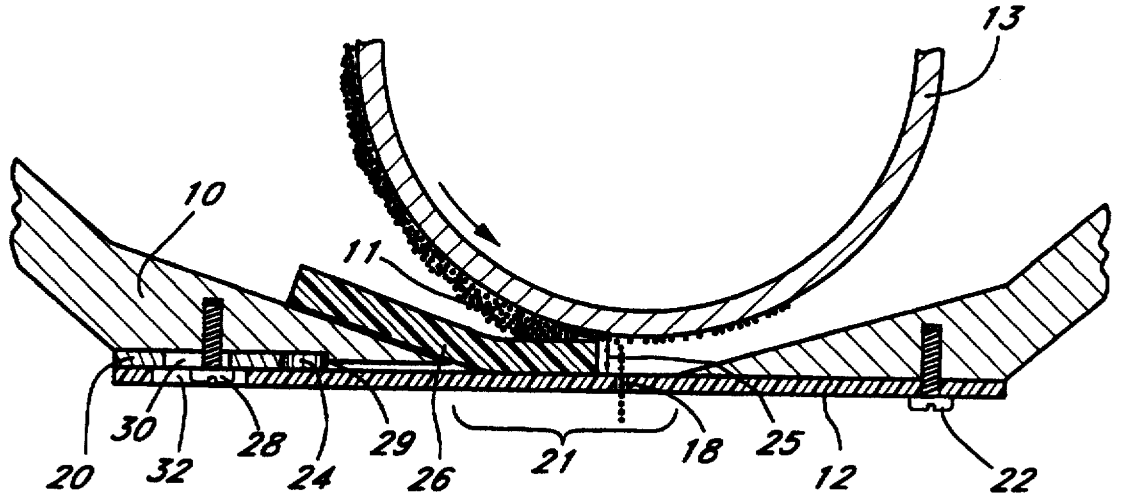
FIG. 4 is an alternative embodiment of the invention.

FIG. 2*a* shows an enlarged cross-section through the print zone of FIG. 1. FIG. 3 is a plan view from below of the control electrode array 12 with a cutaway view showing the various elements of the device and the mounting of the control electrode array 12 and the scraper blade 26 to the container 10. As illustrated in FIG. 2*a* and 3, the control electrode array 12 is shown with one control electrode in the print condition where the toner particles 11 pass through one of the apertures 18 to be deposited on the image receiving substrate 15. A scraper blade 26 is positioned such that it extends from the electrode array to the particle source to space the array from the particle source. Preferably, the scraper blade 26 is attached to the control electrode array 12 by a suitable means, such as an adhesive. Alternatively, the scraper blade may be attached to the container 10, such that it is in contact with the control electrode array 12 as shown in FIG. 4. The scraper blade 26 is generally rectangular in cross-section having a similar length L as the particle carrier 13.

One side of the control electrode array 12 is fastened in a fixed position to the container 10 by screws 22. The other side of the control electrode array is fastened to a plate 20 by screws 27 (see FIG. 3). The plate 20 is generally rectangular in cross-section having a similar length L as the particle carrier 13 and the scraper blade 26. The plate has two oblong apertures, slots 30, whose longitudinal axis is perpendicular to the longitudinal axis of the plate 20. The plate 20, along with the attached control electrode array 12 is fastened into a recess 29 in the container 10 by screws 28 passing through the slots 30. The control electrode array 12 is now fixed on one end, with the opposite end allowed some degree of movement in the direction along the longitudinal axis of the slots 30. In order to maintain the control electrode array 12 in a taut position, two springs 24, preferably conventional leaf-type springs, are positioned between the plate 20 and the recessed edge 29 of the container 10 in the same plane as the slots 30 to provide a force in a direction away from the fixed end of the control electrode array 12.

The force applied by the springs 24 acts to draw the control electrode array 12 taut across the opening 21 and to bias the scraper blade 26 toward the particle carrier 13. Contact of the scraper blade 26 to the particle carrier 13 establishes a gap 25 between the particle carrier surface 13 and the control electrode array 12, this gap distance corresponding to the thickness of the scraper blade 26.

Figure 2B:
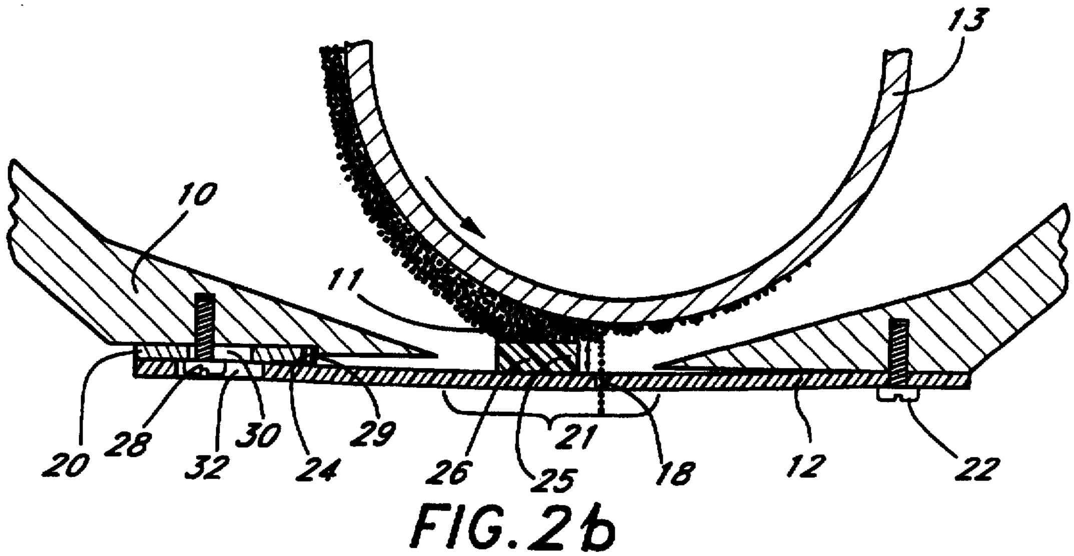
FIG. 2*b* is an enlarged schematic section through the print zone of FIG. 1 showing the scraper dynamically adjusting to a variation in particle thickness.

FIG. 2*b* is an enlarged section through the print zone of FIG. 1 showing the scraper dynamically adjusting to a variation in particle thickness. The adjustments are exaggerated for illustration purposes.

Operation of the method will be described with reference to FIG. 2*a* and 2*b*. As the particle carrier 13 rotates, the particles 11 are held firmly to the surface by magnetic or electrostatic forces and displace the scraper blade 26 to allow a layer of particles 11 of minimal thickness to pass by the scraper blade 26. As the particles 11 pass between the scraper blade 26 and the particle carrier 13, the scraper blade 26 and the control electrode array 12 are displaced to maintain a constant gap 25 between the particles 11 and the control electrode array 12. FIG. 2*b* shows the operation of the device when a combination of independent factors, such as manufacturing variations, has resulted in an irregularity in the thickness of the particle layer 11. In the prior art such an irregularity might result in the particle layer 11 coming into contact with the control electrode array 12. Here, however, the particle layer 11 with an excessive thickness simply displaces the scraper blade 26, and thus the control electrode array 12 away from the particle layer 11, thus preventing contact between the particle layer 11 and the control electrode array 12. As illustrated in FIG. 2*b*, the gap 25 is the distance between the circumferential surface of the particle layer 11 and the control electrode array 12. Thus, although the distance between the particle carrier 13 and the control electrode array 12 increases, the gap distance 25 remains constant as determined by the scraper blade thickness.

If not accounted for, the constant cyclical displacement of the scraper blade 26 adjusting to variations in particle layer thickness would soon result in mechanical fatigue and deformation of the control electrode array material. The present device prevents the mechanical fatigue of the control electrode material by utilizing the slots 30 which allow additional movement to reduce the strain placed on the control electrode array material. In operation, as shown in FIG. 2*b*, as the scraper blade 26 and the center of the array 12 is displaced vertically downward, the slots 30 simultaneously allow the horizontal displacement of the free edge of the control electrode array 12 toward the fixed edge of the array. Nevertheless, the gap distance 25 is maintained at a constant value according to the thickness of the scraper blade 26, independent of the thickness of the particle layer 11. The undesirable effect of combined multiple mechanical variations is eliminated, and a minimum spacing between the particles 11 and control electrode array 12 is achieved and maintained.

According to this embodiment of the present invention, therefore, it becomes possible to provide a method for dynamically positioning the control electrode array 12. By minimizing the distance between the control electrode array 12 and the particle carrier 13 the invention results in a device with a simple structure which enhances the printing quality of direct electrostatic printers.

The foregoing description should be taken as illustrative and not as limiting. It is possible to apply the invention to other printing methods that also utilize a particle carrier and a control electrode array to control the flow of charged particles to an image receiving substrate. Accordingly, the invention is not strictly limited to the specific methods and devices described herein.

What is claimed is:

1. A direct electrostatic printing apparatus comprising:

a rotating source of charged particles;

an image receiving substrate spaced from the particle source;

an electrode array positioned between the image receiving substrate and the particle source for effecting transfer of charged particles from said source to said substrate to form an image configuration on the substrate; and a scraper blade extending from the electrode array to the particle source to space the array from the particle source.

2. A direct electrostatic printing apparatus comprising:

a container having a pair of side walls, and a bottom wall with an elongated opening;

a rotating source of charged particles positioned within the container adjacent to the elongated opening and aligned such that its longitudinal axis is substantially parallel with the elongated opening;

an image receiving substrate positioned below the container;

an elongated place having a pair of spaced slots formed therein, the plate being secured to the container adjacent said opening by fasteners extending through said slots;

and electrode array positioned between the image receiving substrate and the particle source, the array being secured on one edge to the container to the right of the opening and being secured on another edge to said plate;

a scraper blade extending from the electrode array to the particle source to space the array from the particle source; and one or more springs to provide a force on said plate in a direction away from said one edge of the array to maintain the array in a taut condition across the opening to cause the scraper blade to be held adjacent the particle carrier, while permitting the array and the blade to follow a surface of the particle source.

3. The apparatus of claim 2 wherein the charged particles receive at least a portion of their charge by electrical conduction through or electrical contact with the scraper blade.

4. A method of positioning an electrode array in an image recording apparatus comprising the steps of:

providing a rotating source of charged particles;

positioning an image receiving substrate adjacent the particle source such that a gap exists therebetween;

positioning an electrode array between the substrate and the source to effect the transfer of charged particles across the gap to the image receiving substrate; and spacing the array from the particle source with a scraper blade which extends from the electrode array to the particle source.

5. The method of claim 4, further comprising the steps of:

rotating the particle carrier with particles held firmly to the surface by magnetic or electrostatic forces; and displacing the scraper blade to allow a layer of particles to pass the scraper blade while maintaining a constant spacing between the particle surface and the electrode array surface.

6. A method of positioning an electrode array in an image recording apparatus comprising the steps of:

providing a container having a wall with an elongated opening formed therein;

positioning a rotating source of charged particles within the container adjacent to the elongated opening and aligned such that its rotating axis is substantially parallel with the elongated opening;

positioning an image receiving substrate adjacent to but spaced from the container;

securing an elongated plate having a pair of spaced slots formed therein to the container adjacent the opening by fasteners extending through said slots, the slots being oriented to permit the plate to move laterally towards and away from the opening;

positioning an electrode array between the image receiving substrate and the particle source;

securing one edge of the electrode array to the container adjacent the opening;

securing another edge of the array to the plate;

positioning a scraper blade to space the array from the particle source; and positioning a pair of springs adjacent to the plate to provide a force in a direction away from said one edge of the array to maintain the array in a taut condition across the opening to cause the scraper blade to be urged against the particle carrier.

7. The method of claim 6, further comprising the steps of:

rotating the particle carrier with particles held to the carrier surface by magnetic or electrostatic forces; and displacing the scraper blade to allow a layer of particles to pass the scraper blade while maintaining a constant spacing between the particle surface and the electrode array surface.

8. The method of claim 6, further comprising the step of:

charging the particles such that at least a portion of their charge is received by electrical conduction through or electrical contact with the scraper blade.

9. The apparatus of claim 1 wherein the bladeis mounted to the array.

10. The apparatus of claim 9 wherein the array is mounted to cause the blade to be held against the particles.

11. The apparatus of claim 1 wherein the blade is mounted adjacent to the array and held in contact with the array.

12. The apparatus of claim 1 wherein the array is flexibly mounted so as to hold the blade against the particles, and the space is equal to a thickness of the blade.

* * * * *

UNITED STATES PATENT AND TRADEMARK OFFICE

CERTIFICATE OF CORRECTION

PATENT NO. : 5,666,147

DATED : September 9, 1997

INVENTOR(S) : Ove Larson

It is certified that error appears in the above-identified patent and that said Letters Patent is hereby corrected as shown below:

In column 8 at line 34, change "the bladeis" to --the blade is--

Signed and Sealed this

Sixth Day of February, 2001

Attest:

Attesting Officer

Q. TODD DICKINSON

*Director of Patents and Trademarks*